United States Patent
Taliwal

(10) Patent No.: US 12,488,626 B1
(45) Date of Patent: *Dec. 2, 2025

(54) LIVENESS DETECTION

(71) Applicant: Jumio Corporation, Sunnyvale, CA (US)

(72) Inventor: Vikas Taliwal, South Hamilton, MA (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,445

(22) Filed: Jan. 25, 2024

Related U.S. Application Data

(63) Continuation of application No. 17/363,688, filed on Jun. 30, 2021, now Pat. No. 11,922,731.

(51) Int. Cl.
| | |
|---|---|
| *G06V 40/70* | (2022.01) |
| *G06V 20/40* | (2022.01) |
| *G06V 40/18* | (2022.01) |
| *G06V 40/19* | (2022.01) |
| *G06V 40/40* | (2022.01) |

(52) U.S. Cl.
CPC .............. *G06V 40/45* (2022.01); *G06V 20/40* (2022.01); *G06V 40/19* (2022.01); *G06V 40/193* (2022.01); *G06V 40/70* (2022.01)

(58) Field of Classification Search
CPC ........ G06V 40/45; G06V 20/40; G06V 40/19; G06V 40/193; G06V 40/70
See application file for complete search history.

(56) References Cited

U.S. PATENT DOCUMENTS

| | | | |
|---|---|---|---|
| 9,590,985 | B2 | 3/2017 | Bentley |
| 10,599,934 | B1* | 3/2020 | Lowe ..................... G06V 40/19 |
| 10,735,959 | B2 | 8/2020 | Lecun |
| 2009/0133106 | A1 | 5/2009 | Bentley |
| 2010/0321304 | A1* | 12/2010 | Rofougaran ............ G06F 3/046 |
| | | | 345/173 |
| 2014/0307929 | A1* | 10/2014 | Nechyba .............. G06V 40/161 |
| | | | 382/118 |
| 2015/0033305 | A1 | 1/2015 | Shear |
| 2016/0092665 | A1 | 3/2016 | Cowan |
| 2016/0371555 | A1 | 12/2016 | Derakhshani |

(Continued)

FOREIGN PATENT DOCUMENTS

| | | |
|---|---|---|
| WO | 2018175603 A1 | 9/2018 |
| WO | 2019089432 A1 | 5/2019 |

OTHER PUBLICATIONS

Ali et al., "Gaze stability for liveness detection," Pattern Analysis and Applications, vol. 21, Nov. 10, 2016, pp. 437-449, available online at https://link.springer.com/article/10.1007/s10044-016-0587-2.

*Primary Examiner* — Syed Haider
(74) *Attorney, Agent, or Firm* — Patent Law Works LLP

(57) ABSTRACT

The disclosure includes a system and method for detecting liveness including generating a first cue for presentation to a user via a client device, the first cue for inducing a first action when the user is live; receiving sensor data representing a first reaction by the user to the first cue; determining, based on the first reaction, whether the first reaction satisfies a threshold; and determining that the user is live based on a determination that the first reaction satisfies a threshold.

20 Claims, 9 Drawing Sheets

(56) References Cited

U.S. PATENT DOCUMENTS

| | | |
|---|---|---|
| 2017/0076145 A1 | 3/2017 | Gottemukkula |
| 2017/0345146 A1 | 11/2017 | Fan |
| 2018/0046852 A1 | 2/2018 | Ionita |
| 2018/0101721 A1 | 4/2018 | Nienhouse |
| 2019/0019047 A1* | 1/2019 | Zhou .................. G06V 40/45 |
| 2019/0050618 A1 | 2/2019 | Khuri-Yakub |
| 2019/0197331 A1 | 6/2019 | Kwak |
| 2019/0311101 A1 | 10/2019 | Nienhouse |
| 2019/0377963 A1 | 12/2019 | Hamid |
| 2020/0027293 A1 | 1/2020 | Edwards |
| 2020/0293640 A1* | 9/2020 | Joshi .................. G06V 10/82 |
| 2020/0296132 A1 | 9/2020 | Lv |
| 2020/0309930 A1 | 10/2020 | Zhou |
| 2020/0342245 A1 | 10/2020 | Lubin |
| 2021/0251567 A1 | 8/2021 | Bing-Jhang |
| 2021/0334570 A1 | 10/2021 | Hamid |
| 2022/0172729 A1 | 6/2022 | Mohajer |
| 2022/0391482 A1 | 12/2022 | Iris |
| 2023/0108664 A1 | 4/2023 | Kim |

\* cited by examiner

LIVENESS DETECTION

CROSS-REFERENCE TO RELATED APPLICATIONS

The present application is a continuation of U.S. patent application Ser. No. 17/363,688, filed Jun. 30, 3021, titled "Liveness Detection," the entirety of which is hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

BACKGROUND

The present disclosure relates to verification of identity. More specifically, the present disclosure relates to confirming liveness of a user in conjunction with identity confirmation or verification.

Entities, such as governments, businesses, and individuals, may seek to confirm an identity of a person for any number of reasons including: to protect information or digital assets (e.g., bank accounts, password manager accounts, etc.), to protect physical assets (e.g., doors, vaults, borders, etc.), to comply with laws and regulations (e.g., anti-money laundering or other banking regulations), or other reasons. To confirm an identity, a comparison is often made between an attribute (e.g., face) of the person present and a reference documentation associated with that attribute (e.g., photo ID showing the person's face).

SUMMARY

This specification relates to methods and systems for detecting liveness of a user. According to one aspect of the subject matter described in this disclosure, a method of detecting liveness includes generating a first cue for presentation to a user via a client device, the first cue for inducing a first action when the user is live; receiving sensor data representing a first reaction by the user to the first cue; determining, based on the first reaction, whether the first reaction satisfies a threshold; and determining that the user is live based on a determination that the first reaction satisfies a threshold.

Other implementations of one or more of these aspects include corresponding systems, apparatus, and computer programs, configured to perform the actions of the methods, encoded on computer storage devices.

These and other implementations may each optionally include one or more of the following features. For instance, whether the first reaction satisfies the threshold includes determining whether the first reaction includes one or more involuntary actions. The sensor data includes a video from a forward-facing camera associated with the client device capturing a user's eyes, and determining, based on the sensor data, whether the first reaction includes an induced action further includes: applying a gaze detection to the video, the video including a period of time capturing the first reaction of the user responsive to the first cue; determining, based on the gaze detection, whether the first reaction by the user responsive to the first cue includes involuntary eye movement by the user responsive to the first cue. The first action and the first reaction by the user responsive to the first cue include a rapid, discrete, and involuntary eye movement. The first cue includes a first, temporarily displayed visual indicator, the first, temporarily displayed visual indicator displayed at the first display location on the peripheral edge of the client device display. The first, temporarily displayed visual indicator displayed at the first display location on the peripheral edge of the client device display induces the first reaction by the user, the first reaction including a rapid, discrete, and involuntary movement of user eyes toward the first display location. The second action is a voluntary action; receiving a second sensor data representing a second reaction by the user to the second cue; determining, based on the second sensor data, whether the second reaction satisfies a second threshold; and determining that the user is live based on the second reaction by the user satisfying the second threshold. The second cue is perceived by a different sensory organ than the first cue. The second reaction includes one or more of providing a user input requested in the second cue and a manipulation of the client device as requested in the second cue. The second reaction includes the user drawing a shape requested in the second cue using a pointer, where the pointer is one of a user's finger and a mouse, and the second sensor data represents the shape drawn by the user.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The present disclosure is described in the context of an example liveness detector and use cases; however, those skilled in the art should recognize that the liveness detector may be applied to other environments and use cases without departing from the disclosure herein.

To confirm an identity, a comparison is made between an attribute (e.g., a biometric such as a signature, voice, face, retina, palm print, fingerprint, etc.) of the person present and a reference documentation associated with that attribute (e.g., copy of the person's signature, recording of the person's voice, photo ID showing the person's face, scan data of the user's retina, palm, finger(s), etc., respectively). For example, a user wishing to establish his/her identity with an entity, e.g., a government agency or a commercial enterprise, the user may be asked to submit his/her image taken live during the identity establishment process through the entity's application on his/her mobile phone or through the entity's portal on a web browser. The entity may, depending on the implementation, check that the image thus taken matches the photo on an identification document that the user has submitted in order to verify the person's identity, store the image for later identification purposes, or do both.

When confirming an identity remotely or electronically, determining that the attribute received for comparison to the reference documentation is being received from the actual person with whom the attribute is associated, and not being provided by a third-party fraudster looking to mislead the entity, presents technical challenges, which are not present when a person physically presents himself/herself in the physical world along with his/her identification document for comparison. For example, a user attempting to mislead the entity about his/her identity may submit an image of another person for comparison to the reference documentation using an image of that person taken earlier (e.g., by holding the photo on a stolen ID card to the device's camera, playing a recorded video of someone else's face, etc.). As another example, a user may submit a synthetically generated, or altered, face in front of the camera. Moreover, fraudsters may leverage technology to automate a series of repeated, fraudulent attempts to mislead an entity until a successful vector of attack is discovered.

The liveness detector 226 described herein may beneficially detect such fraudulent occurrences by determining liveness, i.e., that the user is a live person currently present at the device.

Figure 1:
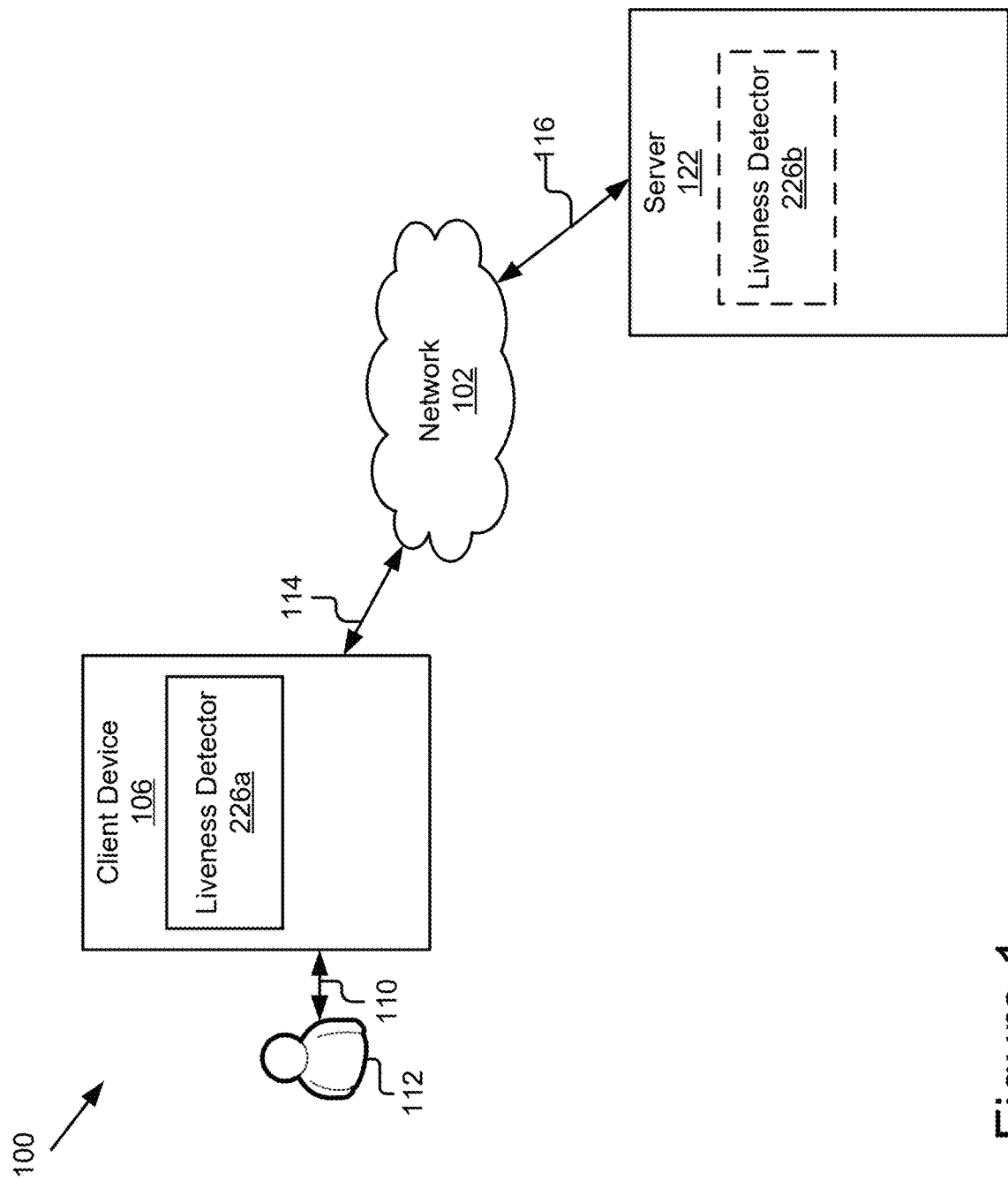
FIG. 1 is a block diagram of one example implementation of a system for detecting liveness in accordance with some implementations.

FIG. 1 is a block diagram of an example system 100 for liveness detection in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may include an instance of the liveness detector 226a and the server 122 may optionally (as indicated by the dashed lines) include an instance of the liveness detector 226b. However, in some implementations, the components and functionality of the liveness detector 226 may be entirely client-side (i.e., at 226a), entirely server side (i.e., at 226b), or divide among the client device 106 and server 122 (i.e., divided across 226a and 226b).

Figure 2:
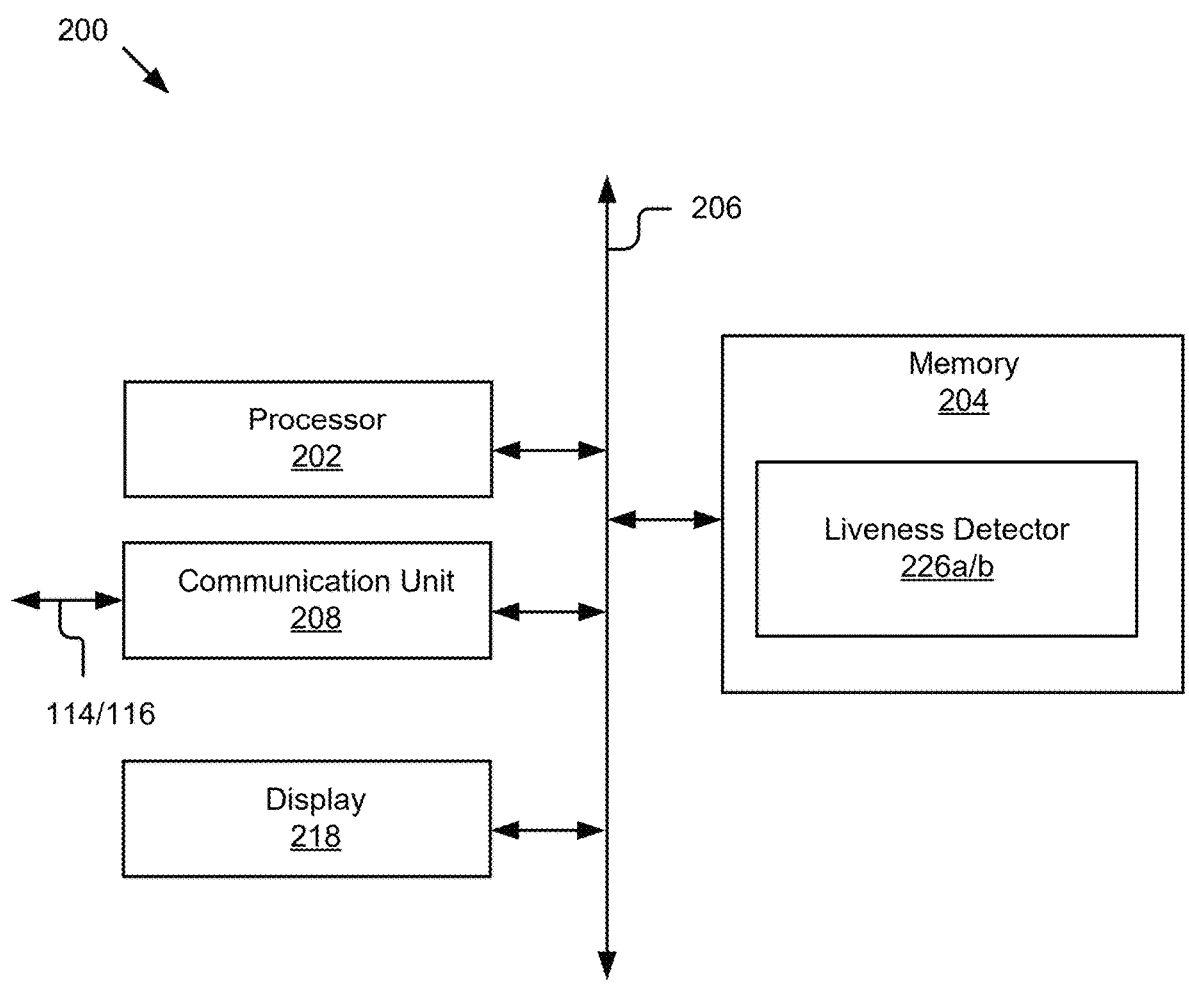
FIG. 2 is a block diagram of an example computing device in accordance with some implementations.

FIG. 2 is a block diagram of an example computing device 200 including an instance of the liveness detector 226. In the illustrated example, the example computing device 200 includes a processor 202, a memory 204, a communication unit 208, and a display 218. In one implementation, the computing device 200 is a client device 106, the memory 204 stores the liveness detector 226a, and the communication unit 208 is communicatively coupled to the network via signal line 114. In another implementation, the computing device 200 is a server 122, the memory 204 stores the liveness detector 226b, and the communication unit 208 is communicatively coupled to the network via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the liveness detector 226a/b. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 is a conventional type such as a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, etc.

Figure 3:
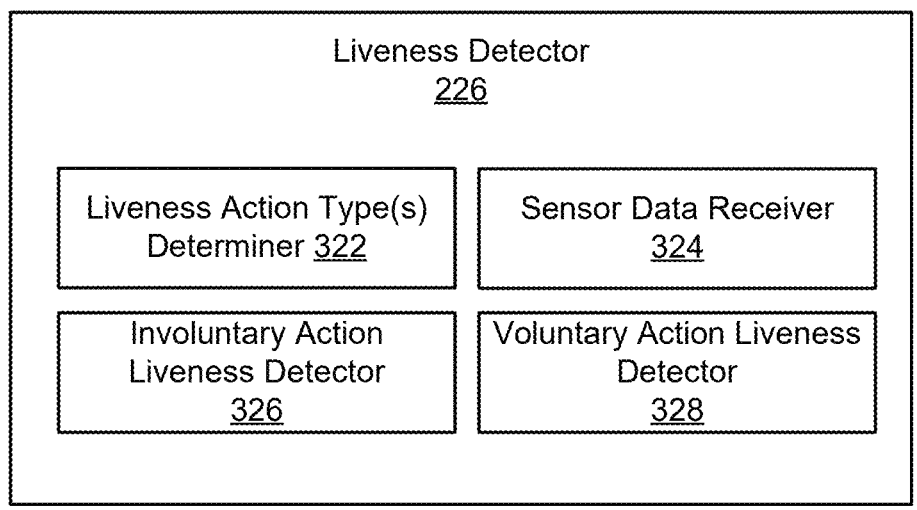
FIG. 3 is a block diagram of an example liveness detector in accordance with some implementations.

Referring now to FIG. 3, a block diagram of an example of liveness detector 226 is illustrated in accordance with one implementation. As illustrated in FIG. 3, the liveness detector 226 may include a liveness action type determiner 322, a sensor data receiver 324, an involuntary action liveness detector 326, and a voluntary action liveness detector 328.

The liveness action type determiner 322 determines one or more types of action to induce from a user. The type of action determined by the liveness action type determiner 322 may include one or more of a voluntary action and an involuntary action. For example, the liveness action type determiner 322 determines to induce an involuntary action (e.g., based on an ocular reflex). In another example, the liveness action type determiner 322 determines to induces a voluntary action (e.g., based physical interaction with the user's client device 106). In yet another example, the liveness action type determiner 322 may determine to induce an involuntary action and a voluntary action in series, in either order, or in parallel. For example, the liveness action type determiner 322 determines to induce an involuntary action, and responsive to the involuntary action liveness detector 326 failing to detect liveness, determines to induce a voluntary action. In another example, the liveness action type determiner 322 determines to induce an involuntary action (e.g., based on an involuntary eye movement triggered by flashing a dot on the screen) while a voluntary action (e.g., as a user draws a shape on the screen) is induced contemporaneously.

In some implementations, the liveness action type determiner 322 determines one or more types of action to induce based on a user characteristic. Examples of user characteristics may include, but are not limited to, a user history, a risk categorization (e.g., based on a physical or electronic source of the request), a diagnosis (e.g., blindness, deafness, Horner syndrome, paralysis, arthritis, etc.) that may affect the user's ability to act, or act timely, in response to cues inducing the action, etc. or a combination thereof (e.g., a combination of a user history and a risk categorization, user history and a diagnosis, or a risk categorization and a diagnosis). For example, if from user history it is known that the user may be blind, only auditory or haptic cue based detection may be determined and used; if from current diagnosis, it is known that the user is deaf, instructions may be determined and issued via voice; if from risk characterization, it is determined that it is potentially high-risk situation (e.g., as assessed from user id or IP address), the liveness check may be repeated more than a usual number of times and/or the accuracy of user performance may be subjected to a more stringent threshold. The foregoing user characteristics can be used alone or in combination depending on the implementation and use case.

For example, assume the liveness action type determiner 322 obtains data indicating the user is visually impaired (e.g., as part of retrieving the user's photo ID as a reference document, which indicates that the user is legally blind); in some implementations, the liveness action type determiner 322 determines that inducing an involuntary action of detecting eye movement has a high probability of failing because the involuntary action available in this example implementation is based on vision; and therefore, selects to induce a voluntary action using auditory cues (i.e. relying on perception by a different sensory organ—the ears in this example instead of the eyes). Examples of sensory organs include the eyes (sense of sight), the nose (olfactory sense), the tongue (sense of taste), skin (sense of touch), and ears (auditory sense).

In some implementations, the liveness action type determiner 322 is communicatively coupled to the involuntary action liveness detector 326 and the voluntary action liveness detector 328. For example, the liveness action type determiner 322 signals the involuntary action liveness detector 326, or a subcomponent thereof, responsive to determining an involuntary action is to be induced, and the involuntary action liveness detector 326, or subcomponents thereof, responsive to the signal, determine one or more cues to induce the involuntary action, send the one or more cues for presentation to the user, and detect whether the involuntary action is present in a user's reaction to the one or more cues. As another example, the liveness action type determiner 322 signals the voluntary action liveness detector 328, or a subcomponent thereof, responsive to determining a voluntary action is to be induced, and signals the voluntary action liveness detector 328 responsive to determining a voluntary action is to be induced, and the voluntary action liveness detector 328, or subcomponents thereof, responsive to the signal, determine one or more cues to induce the voluntary action, send the one or more cues for presentation to the user, and detect whether the voluntary action is present in a user's reaction to the one or more cues.

It should be recognized that, while the illustrated implementation of FIG. 3 includes both an involuntary action liveness detector 326 and a voluntary action liveness detector 328, some implementations may determine liveness based on a single type of action (i.e., voluntary or involuntary) and such an implementation may omit the module associated with the unused action type. For example, the involuntary action liveness detector 326 may be omitted in implementations that do not use involuntary action to determine liveness, and the voluntary action liveness detector 328 may be omitted in implementations that do not use voluntary action to determine liveness.

The sensor data receiver 324 receives sensor data from one or more sensors. In some implementations, the sensor data represents a user's reaction, if any, that was induced responsive to a presentation of one or more cues to the user by one or more of the involuntary action liveness detector 326 and voluntary action liveness detector 328.

In some implementations, the sensor data receiver communicates with one or more of the involuntary action liveness detector 326, one or more subcomponents of the involuntary action liveness detector 326, the voluntary action liveness detector 328, and one or more subcomponents of the voluntary action liveness detector 328 to determine the one or more sensors from which the sensor data receiver 324 obtains data. For example, assume the involuntary action being induced includes eye movement; in one embodiment, the involuntary action liveness detector 326 communicates with the sensor data receiver 324 to request camera sensor data for a time period associated with one or more cues generated and sent for presentation to the user by the involuntary action liveness detector 326 to induce the involuntary action. As another example, assume the voluntary action being induced includes the user drawing a form on a touchscreen display 218 of the client device 106; in one embodiment, the voluntary action liveness detector 328 communicates with the sensor data receiver 324 to request pointer sensor data from the touchscreen for a time period associated with one or more cues generated and sent for presentation to the user by the voluntary action liveness detector 328 to induce the voluntary action.

In some implementations, the involuntary action liveness detector 326 or voluntary action liveness detector 328 determine whether the user reaction represented in the sensor data is consistent with the involuntary, or voluntary, action(s), to be induced by the involuntary action liveness detector 326 or voluntary action liveness detector 328 using one or more cues sent for presentation to the user.

The sensor data may be used by one or more of the involuntary action liveness detector 326 and voluntary action liveness detector 328 to detect liveness depending on the determined action type(s). In some implementations, the sensor data received by the sensor data receiver 324 is based on one or more of the type of action selected by the liveness action type determiner 322, a sub-type of involuntary action selected by the involuntary action liveness detector 326, and a sub-type of voluntary action liveness detector 328, as described below with reference to FIGS. 4 and 5, and the one or more of the sensors communicatively coupled (not shown) to one or more of the network 102, the client device 106, and the server 122. Examples of sensor data may include, but are not limited to, camera data (e.g., single image or video, thermal or visible/conventional), heart rate monitor data, galvanic sweat sensor data, EEG data, thermocouple data, breathing sensor data, gyroscope data, accelerometer data, pointer sensor data (e.g., from a capacitive touchscreen or mouse), etc. In some implementations, the sensor data receiver 324 receives more than one kind of sensor data. For example, the sensor data receiver 324 receives sensor data from a combination of sensors including (1) camera and gyroscope; (2) camera and accelerometer; (3) camera and pointer sensor; (4) camera, gyroscope, and accelerometer; (5) camera, gyroscope, and pointer sensor; (6) camera, accelerometer, and pointer sensor; (7) camera, gyroscope, accelerometer, and pointer sensor; (8) gyroscope and accelerometer; (9) gyroscope and pointer sensor; (10) gyroscope, accelerometer, and pointer sensor; or (11) accelerometer and pointer sensor.

As described below, the involuntary action liveness detector 326 or voluntary action liveness detector 328, depending on the type of action being induced, generates one or more cues that are sent for presentation to the user to induce the action. The sensor data received by the sensor data receiver 324 includes sensor data captured during a time period associated with the one or more cues, for example, subsequent to a cue. In some implementations, the sensor data includes sensor data captured during a time period beginning within a first threshold period of a cue being presented to the user (e.g., at the time of the presentation of a cue or ±X milliseconds from the presentation of a cue) and having a second period of duration (e.g., Y milliseconds). The values of X and Y may vary depending on the implementation. For example, X may be selected from the range of 0 to 10 milliseconds. The value of Y may be selected from the range of 0.5 seconds to 2 minutes. In some implementations the second period of duration (i.e., Y milliseconds) may vary based on the selected type of action (or subtype) or sensor and a latency associated therewith. For example, sensor data over a first, longer period of time (e.g. up to 2 minutes) may be captured then used by the voluntary action liveness detector 328 to determine whether a voluntary action, such as drawing a cued shape on a touchscreen, occurred as such an action takes time and may take more time before a user begins, and sensor data over a second, shorter period of time (e.g. 2 seconds) may be captured then used by the involuntary action liveness detector 326 to determine whether an involuntary action, such as an involuntary ocular movement occurred, as such an involuntary action may be brief and occur quickly after the cue.

The involuntary action liveness detector 326 determines one or more cues to induce an involuntary action by the user and determines whether the involuntary action is induced based on the sensor data representing a user's reaction when presented the one or more cues. The involuntary action, the one or more cues used to induce the involuntary action, or both may vary depending on the implementation and use case.

In some implementations, the involuntary action liveness detector 326 determines one cue to induce one instance of an involuntary response (e.g., by flashing a dot on the screen to induce an involuntary eye movement). In some implementations, the involuntary action liveness detector 326 determines multiple cues for presentation in parallel to induce an instance of an involuntary response (e.g., a multi-sensory cue by vibrating a haptic motor in coordination with a video of something lunging toward the user, and a loud noise to induce an involuntary startle response, which may be detected based on a jerking of the device 106 and/or a user's involuntary eye movement, such as a flinch or change in pupil size). In some implementations, the involuntary action liveness detector 326 determines multiple cues in a series to induce multiple instances of an involuntary response (e.g., by flashing a dot on the screen at a first location to induce an involuntary eye movement to the first location then flashing a dot on the screen at a second location to induce an involuntary eye movement to the second location). It should be recognized that, while the preceding example describes multiple of the same type of cue (i.e., flashing of a dot) to induce multiple instances of the same involuntary response, other implementations may use multiple, different types of cues to induce the same or different involuntary actions.

Figure 9:
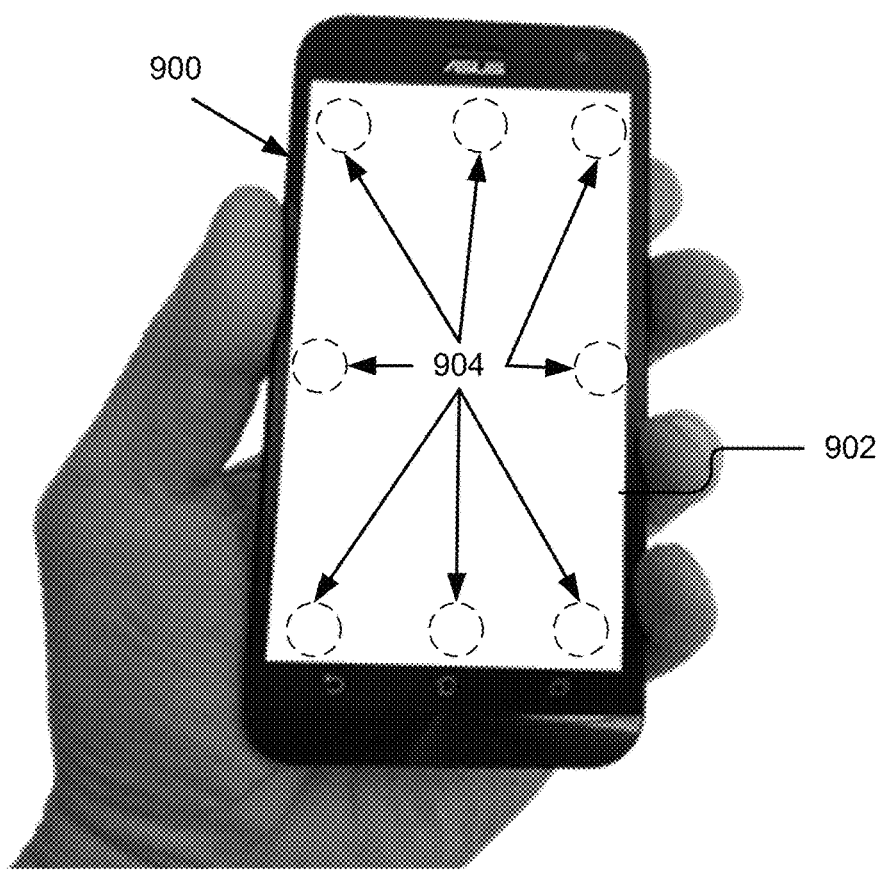
FIG. 9 illustrates a graphic representation of an example display of a mobile phone including a plurality of predetermined locations on the display is illustrated in accordance with some implementations.
Figure 10:
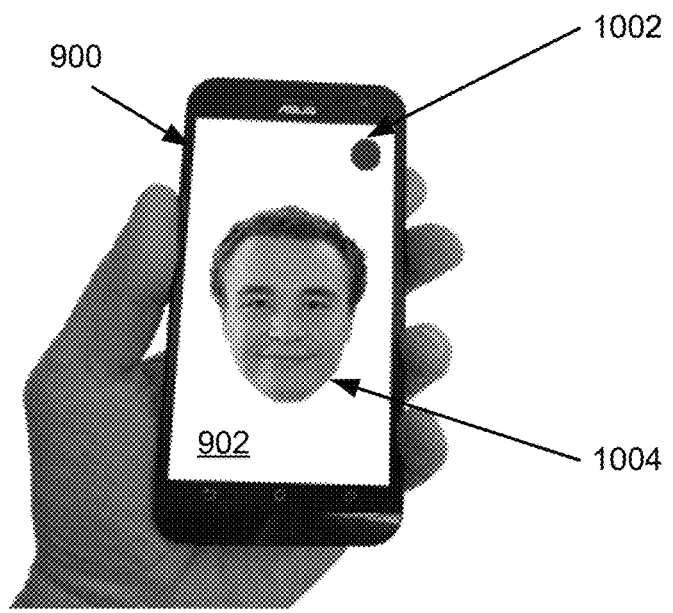
FIG. 10 illustrates a graphic representation of an example user interface associated with liveness detection based on an involuntary action in accordance with some implementations.

In some implementations, the involuntary action liveness detector 326 may induce one or more types of involuntary action, which comprise the one or more subtypes of action. For clarity and convenience, the description below, with reference to FIGS. 4, 9, and 10, refers to an example in which the involuntary action is an involuntary ocular movement induced by a temporary presentation of a visual cue on a display of the client device 106 (e.g., a mobile phone). However, it should be recognized that many other involuntary actions and cues exist and are within the scope of the disclosure herein.

Examples of involuntary action include, but are not limited to, involuntary ocular movement (e.g., pupillary light reflex, pupillary dark reflex, blinking, flinching, movement reacting to a cue, pupil dilation, pupil convergence, lens curvature, etc., which may be detected in some implementations using sensor data from a camera), an electrical response in the brain (e.g. activity in particular regions of the brain, which may be detected by an EEG), a vascular response (e.g. a change in pulse, as detected by a heart rate monitor, a change in blood pressure, as detected using a blood pressure cuff, a flushing of the skin, as detected using a thermal camera, thermocouple, or galvanic sweat detector), a change in a rate of breathing or a holding of breath, etc.

The one or more cues generated by the involuntary action liveness detector 326 and the involuntary action being induced may vary, for example, based on one or more of the involuntary action being induced, the sensors associated with the client device 106 (not shown), and the outputs (not shown) associated with the client device 106. For example, the involuntary action liveness detector 326 may determine no thermal sensors are available and eliminate involuntary actions that cannot be detected without thermal sensor data (e.g., a flushing of the skin or rise in skin temperature), but determines a camera is available via the client device 106 and determines to induce an involuntary response detectible by camera (e.g., in an image or video).

Depending on the implementation, a cue may be auditory, visual, or tactile. In some implementations, a plurality of cues in series or parallel may be generated to induce an involuntary action or set of involuntary actions. An example of a cue inducing an involuntary action includes a brief presentation of a visual cue (e.g., a flashing of a dot) at the periphery of a display, or at a periphery of the user's point of gaze, which induces an involuntary ocular movement of the user's eyes in the direction of the visual cue. As another example, a presentation of a series of images (or voice clips), i.e., cues, including one image (or voice clip) of a loved one to induce an involuntary response, e.g., pupil dilation, flushing of the skin, activity in certain regions of the brain, etc., when the image (or voice clip) of the loved one is presented. As yet another example, an intense vibration using a client device's haptic motor, i.e., a cue, and/or presenting a video of something (e.g., a snake) suddenly lunging toward the camera/user, i.e., another cue, may trigger an involuntary blink, flinch, or jerking of the client device 106. As still another example, a cue may include a loud noise using the client device's speakers, which may induce an involuntary blink, flinch, or jerking of the client device 106.

The voluntary action liveness detector 328 determines one or more cues to induce a voluntary action by the user and determines whether the voluntary action is performed based on the sensor data representing a user's reaction when presented the one or more cues. The voluntary action, the one or more cues used to induce the voluntary action, or both may vary depending on the implementation and use case.

In some implementations, the voluntary action liveness detector 328 determines one cue to induce one instance of a voluntary response (e.g., by audibly instructing the user to perform an action). In some implementations, the voluntary action liveness detector 328 determines multiple cues for presentation in parallel to induce an instance of a voluntary response (e.g., by presenting text, providing a dashed lined shape to trace, and providing audible instructions to the user). In some implementations, the voluntary action liveness detector 328 determines multiple cues in a series to induce multiple instances of a voluntary response (e.g., by instructing the user to draw a shape on the touchscreen then to draw a second shape on the touchscreen). It should be recognized that, while the preceding example describes multiple of the same type of cue (i.e., instructions to draw a shape) to induce multiple instances of the same type of voluntary response, other implementations may use multiple, different types of cues to induce the same or different voluntary actions.

Figure 11:
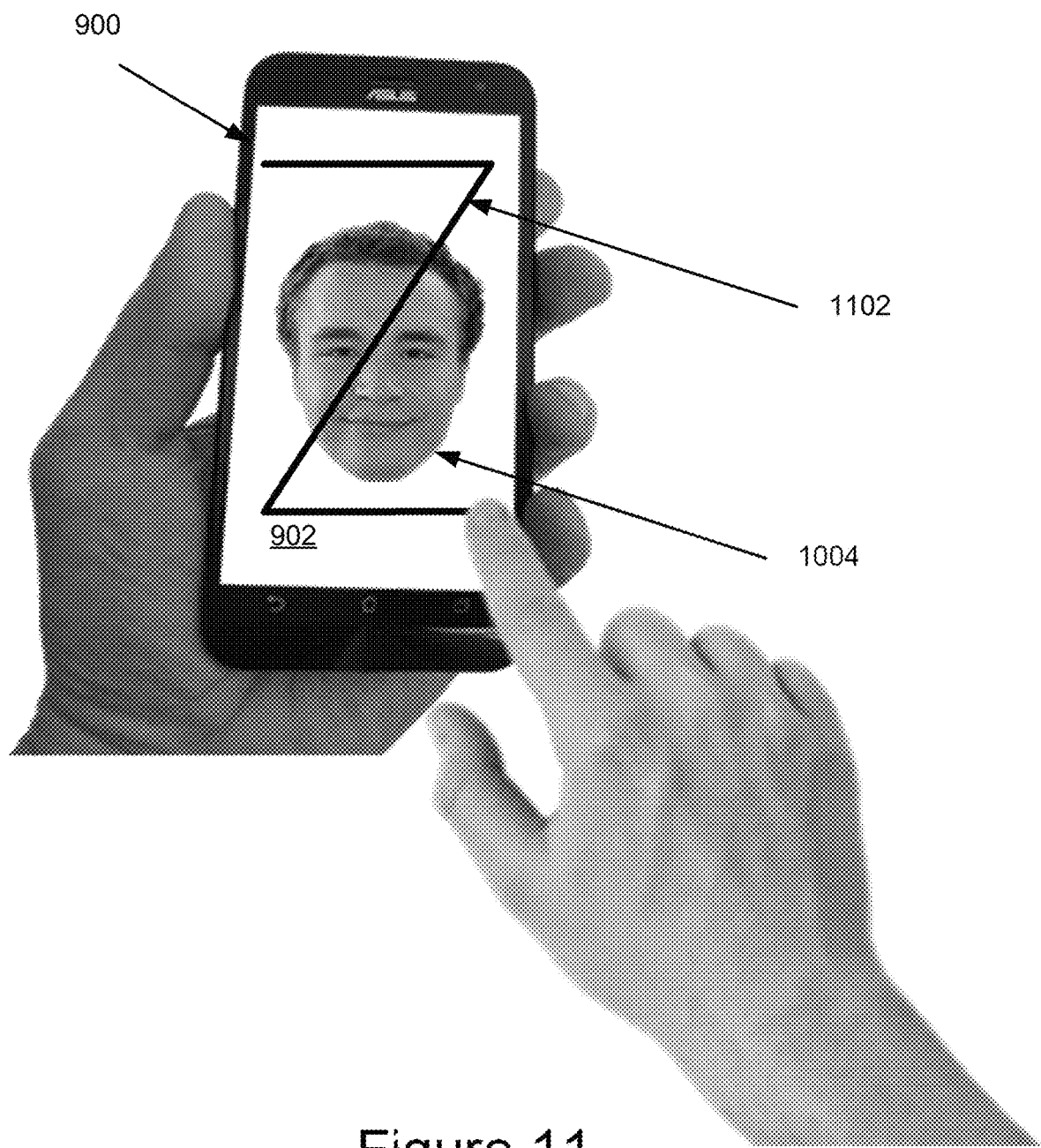
FIG. 11 illustrates a graphic representation of an example user interface associated with liveness detection based on a voluntary action in accordance with some implementations.

In some implementations, the voluntary action liveness detector 328 may induce one or more types of voluntary action (i.e., one or more subtypes of action). For clarity and convenience, the description below, with reference to FIGS. 5 and 11, refers to an example in which the voluntary action includes the user drawing a pattern on a display of the client device 106 (e.g., a mobile phone). However, it should be recognized that many other voluntary actions and cues exist and are within the scope of the disclosure herein.

Examples of voluntary action include, but are not limited to, voluntary, or intentional, user input (e.g., via a microphone, keyboard, camera, mouse, touchscreen, etc., as directed by one or more cues), and voluntary, or intentional, physical manipulation of the client device 106 (e.g., as directed by one or more cues). Examples of voluntary user input may include, by way of example and not limitation, a user speaking a phrase indicated by a cue (e.g., "say cheese"), a user tracing or drawing a pattern as indicated by a cue on a touchscreen (e.g., "draw a Z", a user performing a gesture (e.g., covering his or her eyes on camera), a user moving relative to the device 106 (e.g., look up, or turn sideways), etc. Examples of physical manipulation of the client device include, by way of example and not limitation, moving the client device 106 in space (e.g., move your phone in a circle). In some implementations, the voluntary action may include both a voluntary user input and a voluntary manipulation of the client device 106, e.g., by moving the phone in a circle (physical manipulation) while keeping your face in frame of the camera (user input).

Depending on the implementation, a cue may be auditory (e.g., verbal instructions), visual (e.g., textual instructions presented for display or demonstration of the voluntary action being induced by the cue), or tactile (e.g., haptic). In some implementations, a plurality of cues, in series or parallel, may be generated to induce a voluntary action or set of voluntary actions. The one or more cues generated by the voluntary action liveness detector 328 may vary, for example, based on one or more of the voluntary action being induced, the sensor(s) associated with the client device 106, and the outputs associated with the client device 106. For example, the voluntary action liveness detector 328 may determine that the client device 106 is a laptop or desktop, which does not have an accelerometer or gyroscope, and, therefore, determines not to induce a voluntary action involving physical manipulation of the client device 106 in space (e.g., shaking or moving the laptop or desktop in a circle).

Figure 4:
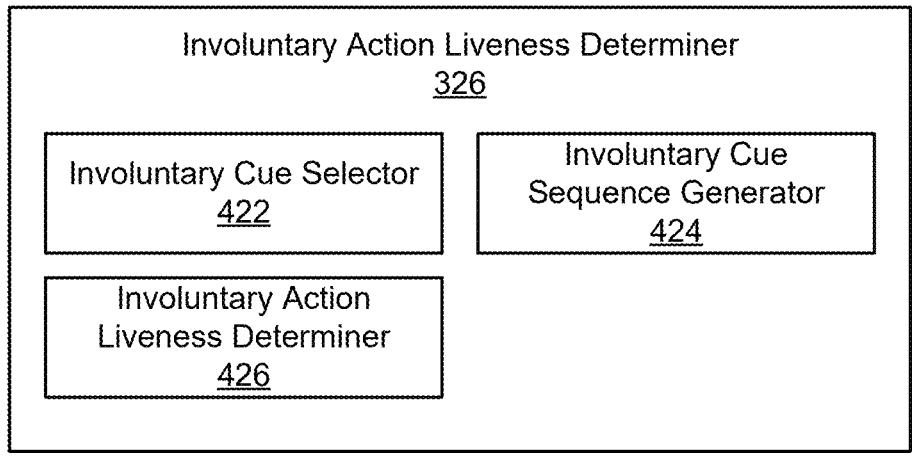
FIG. 4 is a block diagram of an example involuntary action liveness detector in accordance with some implementations.

Referring now to FIG. 4, a block diagram of an example involuntary action liveness detector 326 is illustrated in accordance with some implementations. As illustrated in FIG. 4, the involuntary action liveness detector 326 includes an involuntary cue selector 422, an involuntary cue sequence generator 424, and an involuntary action liveness determiner 426.

The involuntary cue selector 422 selects a set of one or more cues to induce one or more involuntary actions. For example, the involuntary cue selector 422 receives a signal from the liveness action type determiner 322 responsive to a determination to induce an involuntary action type.

In some implementations, the involuntary cue selector 422 obtains user profile data. In some implementations, the user profile data includes a user characteristic. In some implementations, the involuntary cue selector 422 selects the set of one or more cues based on the user profile data. For example, assume the user profile data indicates the user is visually impaired; in one embodiment, the involuntary cue selector 422 selects an involuntary action and one or more cues that are not based on vision.

In some implementations, a selected cue and the involuntary action to be induced may have a one-to-one ratio. For example, assume the set of cues includes a first cue and a second cue; in one implementation, the involuntary cue selector 422 selects the first cue to induce a first involuntary action, and the second cue to induce a second involuntary action. Depending on the implementation, the first and second cues may be similar (e.g., flash of a dot, but at different locations), the same (e.g., dot flashing at the same location), or different (e.g., flashing a dot on the screen and triggering a haptic vibration), and/or the first and second involuntary action may be similar, the same, or different. In some implementations, the selected cue and the involuntary action to be induced may have a many-to-one ratio. For example, the involuntary cue selector 422 selects a first cue (e.g., a loud noise) and a second cue (e.g., intense haptic vibration) that together induce a first involuntary action (e.g., a flinch).

In some implementations, the involuntary cue selector 422 selects the one or more cues based on one or more criteria. Examples of criteria include, by way of example and not limitation, the senor(s) associated with the client device 106, user characteristic(s) (e.g., to account for a user disability that may render certain cues, such as audio in the case of deafness and visual in the case of blindness, or certain involuntary actions ineffective and select cues that rely on a different sensory organ), the type(s) of involuntary action to be induced, etc. For example, the involuntary cue selector 422 selects the one or more cues based on a combination of the sensor(s) associated with the client device 106 and user characteristic(s); the sensor(s) associated with the client device 106 and the type(s) of involuntary action to be induced; user characteristic(s) and the type(s) of involuntary action to be induced; or the senor(s) associated with the client device 106, user characteristic(s), and the type(s) of involuntary action to be induced.

In some implementations, the involuntary cue selector 422 selects the one or more cues using randomization. For example, the involuntary cue selector 422 randomly selects a type of involuntary action (e.g., involuntary eye movement) and selects a cue that induces that involuntary action (e.g., a flash of a dot).

In some implementations, the involuntary cue selector 422 selects a characteristic of the cue using randomization. For example, assume the involuntary cue selector 422 selects to temporarily present (e.g., flash) a visual indicator (e.g., a dot) to induce an involuntary eye movement; in one implementation, the involuntary cue selector 422 randomly selects a position (i.e., an example characteristic) on the display where the visual indicator is temporarily presented. In some implementations, the position on the display is selected from a predetermined set of positions. In some implementations, the predetermined set of positions are located around the outer edge of the display, occasionally referred to as peripheral edge, outer periphery, or similar. For example, referring to FIG. 9, a graphic representation of an example display of a mobile phone 900 is illustrated with eight (8) predetermined locations 904, indicated by the dashed circles around the outside edge of the touchscreen display 902, in which a visual indicator may be presented.

The involuntary cue sequence generator 424 receives the set of cues generated by the involuntary cue selector 422, generates, and then sends a sequence of the selected set of cues for presentation to the user. In some implementations, a length of the sequence generated by the involuntary cue sequence generator 424 may be dynamic. For example, the sequence randomly varies in a number of cues, the period of time over which the cues are presented, or both to thwart replay attacks. In another example, assume that some types of cues or involuntary actions are less likely to be detected absent user liveness; in some implementations, a sequence comprising a first type of cue or inducing a first type of involuntary action associated with a lower likelihood of a false positive for liveness, may be shorter than a sequence comprising a second type of cue or inducing a second type of involuntary action associated with a higher relative level of false positives for liveness.

In some implementations, the number of cues selected by the involuntary cue selector 422, the length of the sequence generated by the involuntary cue sequence generator 424, or both are determined so the involuntary action liveness determiner 426 may determine liveness (or lack thereof) based on a presence (or absence) of the one or more involuntary actions and a threshold level of confidence. For example, assume that a fraudster is trying to mislead the system 100 using a video recording of another individual and that the sequence generated by the involuntary cue sequence generator 424 is a sequence of dots randomly flashing at one of the eight positions 904 illustrated in FIG. 9. There is a chance that, for example, a previously recorded video of an individual or synthetically generated face happens to include eye movement that coincides with one instance of the dot flashing one time at one location. However, when the sequence is two, three, or more flashes, and each flash is presented at a location randomly selected from the set of predetermined positions 904, the likelihood that the video, or a source other than a live user, includes involuntary actions that coincide with the full set, or a predetermined portion of the set of cues, to satisfy a confidence threshold is low. Additionally, the randomization by the involuntary cue selector 422, the involuntary cue sequence generator 424, or renders the probability of a successful replay attack low or virtually non-existent, as the cues, the action(s) induced, or both randomly change from one liveness detection event to the next.

In some implementations, the sequence is generated so that, when presented, the sequence induces multiple, involuntary actions that are rapid and discrete events. For example, the sequence is generated and presented (e.g., as a sequence of dots briefly flashed at random locations distributed around the periphery) so that the user's eyes (if live) reflexively and rapidly dart in the direction of the flashing dot, then dart to the next flashing dot in the sequence, and are not timed or presented so as to allow smooth or continuous tracking, by the user's eyes, from one position to the next.

The involuntary action liveness determiner 426 is communicatively coupled to the sensor data receiver 324, receives sensor data, and determines, based on the sensor data, whether liveness is detected. For example, referring to FIG. 10, assume that the user 112 is using a forward-facing camera (not shown) of the mobile phone 900 to present a face for comparison with a reference image, which is facilitated by displaying the camera's field of view, and thus the user's face 1004 on the screen 902. While the user is looking at the screen 902 to align the camera with his face, the dot 1002 is randomly presented at the top right-hand corner of the display 902, in one of the 8 possible positions. In one implementation, the involuntary action liveness determiner 426 receives sensor data including video captured by the mobile phone's forward-facing camera (not shown) during and for a period after the dot 1002 is flashed, and applies gaze detection to track the user's eye movement. In some implementations, where the set of cues are temporary presentation of a visual indicator at a randomized location, and the sequence of cues are presented, the involuntary action liveness determiner 426 determines (e.g., using gaze detection) that the sensor data includes a sequence of involuntary eye movements that correspond (e.g., based on time and direction of movement) to the presentation of the set of cues.

In some implementations, based on the analysis of the sensor data the involuntary action liveness determiner 426 determines a confidence level that the user is live, and when that confidence level satisfies a threshold, the involuntary action liveness determiner 426 detects liveness, if not, the liveness check fails. In some implementations, the confidence level is associated with a portion of the involuntary actions induced in a live user responsive to the one or more cues that is detected in the sensor data representing the user's actual actions responsive to the one or more cues.

Figure 5:
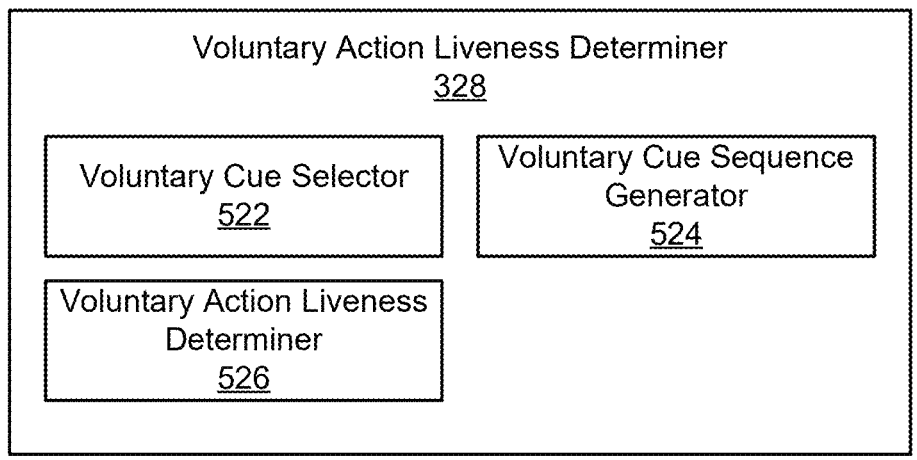
FIG. 5 is a block diagram of an example voluntary action liveness detector in accordance with some implementations.

Referring now to FIG. 5, a block diagram of an example voluntary action liveness detector 328 is illustrated in accordance with one implementation. As illustrated in FIG. 5, the voluntary action liveness detector 328 may include a voluntary cue selector 522, a voluntary cue sequence generator 524, and a voluntary action liveness determiner 526 in accordance with some implementations.

The voluntary cue selector 522 selects a set of cues to induce one or more voluntary actions. For example, the voluntary cue selector 522 receives a signal from the liveness action type determiner 322 responsive to a determination to induce a voluntary action type.

In some implementations, the voluntary cue selector 522 obtains user profile data. In some implementations, the user profile data includes a user characteristic. In some implementations, the voluntary cue selector 522 selects the set of one or more cues based on the user profile data. For example, assume the user profile data indicates the user is paralyzed; in one embodiment, the voluntary cue selector 522 selects a voluntary action and one or more cues that are not based on the user providing input or physically manipulating the phone with his or her hands.

In some implementations, a selected cue and the voluntary action to be induced may have a one-to-one ratio. For example, assume the set of cues includes a first cue and a second cue; in one implementation, the voluntary cue selector 522 selects the first cue to induce a first voluntary action, and the second cue to induce a second voluntary action. Depending on the implementation, the first and second cues may be similar (e.g., instructions to draw a specified shape using a finger or pointing device), the same (e.g., a repeated request to wink at the camera), or different (e.g., "say cheese" and a request to slowly blink at the camera), and/or the first and second voluntary action may be similar, the same, or different. In some implementations, the selected cue and the voluntary action to be induced may have a many-to-one ratio. For example, the voluntary cue selector 522 selects a first cue (e.g., verbal instructions) and a second cue (e.g., visual text instructions or a visual demonstration of the voluntary action on a display device) that together induce the first voluntary action (e.g., a drawing of a Z on the touchscreen).

In some implementations, the voluntary cue selector 522 selects the one or more cues based on one or more criteria. Examples of criteria include, by way of example and not limitation, the senor(s) associated with the client device 106, user characteristic(s) (e.g., to account for a user disability that may render certain cues ineffective, such as audio in the case of deafness and visual in the case of blindness, or certain voluntary actions non-performable by the user, such as moving the phone in a circle when the user is quadriplegic), the type(s) of voluntary action to be induced, etc. For example, the voluntary cue selector 522 selects the one or more cues based on a combination of the sensor(s) associated with the client device 106 and user characteristic(s); the sensor(s) associated with the client device 106 and the type(s) of voluntary action to be induced; user characteristic(s) and the type(s) of voluntary action to be induced; or the senor(s) associated with the client device 106, user characteristic(s), and the type(s) of voluntary action to be induced.

In some implementations, the voluntary cue selector 522 selects the one or more cues using randomization. For example, the voluntary cue selector 522 randomly selects a type of voluntary action (e.g., drawing of a shape) from a plurality of types of voluntary actions and selects a cue that induces that voluntary action (e.g., visual and/or audio instructions requesting that a specified shape be drawn).

In some implementations, the voluntary cue selector 522 selects a characteristic of the cue using randomization. For example, assume the voluntary cue selector 522 selects to a cue requesting that the user draw a specified shape to induce the voluntary movement drawing the specified shape; in one implementation, the voluntary cue selector 522 randomly selects the shape to be drawn. For example, referring to FIG. 11, a graphic representation of an example of a mobile phone 900 is illustrated with a display 902 presenting the user's face 1004 visible to a forward-facing camera (not shown) of the mobile phone 900. In the illustrated example, the user has drawn a Z 1102 on the touchscreen display 902 of the mobile phone 900 using his finger responsive to a cue (not shown), such as a dotted line Z, which the user traced to create the Z 1102 illustrated, or an audio cue requesting that the user draw a Z on the touchscreen 902. It should be recognized that drawing a Z is merely an example and that drawing other forms is within the scope of the present disclosure. Examples of forms a user may be cued to draw a include, but are not limited to, a letter or character of an alphabet whether English or another language; a numeral, e.g., Arabic or Roman; a symbol, e.g., $, #, @, %, =, +, -, ~; a punctuation mark; a shape, e.g., a circle, square, rectangle, diamond, star, heart, cross; etc.

The voluntary cue sequence generator 524 receives the set of cues generated by the voluntary cue selector 522, generates, and then sends a sequence of the selected set of cues for presentation to the user. In some implementations, a length of the sequence generated by the voluntary cue sequence generator 524 may be dynamic. For example, the sequence randomly varies in a number of cues, the period of time over which the cues are presented, or both to thwart replay attacks. In another example, assume that some types of cues or voluntary actions are less likely to be detected absent user liveness; in some implementations, a sequence comprising a first type of cue or inducing a first type of voluntary action associated with a lower likelihood of a false positive for liveness, may be shorter than a sequence comprising a second type of cue or inducing a second type of voluntary action associated with a higher relative level of false positives for liveness.

In some implementations, the number of cues selected by the voluntary cue selector 522, the length of the sequence generated by the voluntary cue sequence generator 524, or both are determined so the liveness determiner 526 may determine liveness (or lack thereof) based on the presence (or absence) of the voluntary actions and a threshold level of confidence. For example, assume that a fraudster is trying to mislead the system 100 using a video recording of another individual and the sequence generated by the voluntary cue sequence generator 524 includes a series of requests that the user repeats a word or phrase specified. There is a (small) chance that, for example, a previously recorded video of an individual or synthetically generated face happens to include audio of the user stating the word or phrase. However, when the sequence is two, three, or more words or phrases long, and each word or phrase is randomly selected, the likelihood that the video, or a source other than a live user, includes audio of the that coincides with the full set, or a predetermined portion of the set of cues, to satisfy a confidence threshold is low. Additionally, the randomization by the voluntary cue selector 522, the voluntary cue sequence generator 524, or renders the probability of a successful replay attack low or virtually non-existent, as the cues, the action(s) induced, or both randomly change from one liveness detection event to the next.

The voluntary action liveness determiner 526 is communicatively coupled to the sensor data receiver 324, receives sensor data, and determines, based on the sensor data, whether liveness is detected. For example, referring to FIG. 11, assume that the user 112 is using a forward-facing camera of the mobile phone 900 to present a face for comparison with a reference image, which is facilitated by displaying the camera's field of view, and thus the user's face 1004 on the screen 902. While the user is looking at the screen to align the camera with his face, user is prompted to draw a Z on the screen. In one implementation, the involuntary action liveness determiner 426 receives sensor data including pointer sensor data (e.g., based on the user's interaction with the touch screen) to determine whether the requested shape, i.e., the Z, was drawn. In another example, such as the example above where the cues induce a sequence of spoken words or phrases, the voluntary action liveness determiner 526 may receive sensor data from the microphone and use talk-to-text to determine whether the word or phrase was received responsive to the cue. In some implementations, the sensor data from the microphone may be compared, by the voluntary action liveness determiner 526, to a voice reference of the user to verify that the voice received is that of the user being presented. In some implementations, the sensor data may be video including audio, and the voluntary action liveness determiner 526 may apply a lip-reading application to the video to determine whether the word or phrase in the audio was uttered by the user visible in the video.

In some implementations, based on the analysis of the sensor data the voluntary action liveness determiner 526 determines a confidence level that the user is live, and when that confidence level satisfies a threshold, the voluntary action liveness determiner 526 detects liveness, if not, the liveness check fails. In some implementations, the confidence level is associated with a portion of the voluntary actions induced in a live user responsive to the one or more cues that is detected in the sensor data representing the user's actual actions responsive to the one or more cues.

It should be recognized that the foregoing description are merely example implementations provided for clarity and convenience and that variations exist and are within the scope of this description. For example, while FIGS. 4 and 5 describe an involuntary cue sequence and a voluntary cue sequence, respectively and separately, in some implementations, a single cue sequence is generated, by the involuntary cue sequence generator 424 and the voluntary cue sequence generator 524 working together, and the single cue sequence may include a combination of involuntary cues (i.e., cues inducing an involuntary action) and voluntary cues (i.e., cues inducing a voluntary action).

In some implementations, the liveness detector 226 includes and uses a random number generator (not shown). In some implementations, the liveness action type determiner 322 uses the random number generator. For example, the liveness action type determiner 322 uses the random number generator to determine one or more of whether to induce an involuntary action, a voluntary action, both in parallel, both in series, and in what relative order.

In some implementations, the involuntary action liveness detector 326, or a subcomponent 422, 424, 426 thereof, uses the random number generator. For example, the involuntary cue selector 422 uses the random number generator to determine a type of involuntary action to be induced from a plurality of involuntary actions detectable by a set of available sensors. In another example, the involuntary cue selector 422 uses the random number generator to determine a type of cue, such as visual, audible, tactile, or a combination thereof. In yet another example, the involuntary cue selector 422 uses the random number generator to determine a characteristic of the cue. Examples of characteristics include, but are not limited to, a location of the cue, a duration of the cue, a timing of the cue, a size of the cue, an input requested, a manipulation of the device requested, etc. For example, referring again to FIG. 9, in one implementation, the involuntary cue selector 422 uses a random number generator to select a number between 1 and 8, where each number corresponds to a position 904 along the outer peripheral edge of the display 902, and a visual indicator is temporarily presented at the randomized location as a cue.

In one example, the involuntary cue sequence generator 424 uses the random number generator to determine a length of a sequence of cues. In another example, the involuntary cue sequence generator 424 uses the random number generator to determine an order of cues in the sequence by assigning each cue a number and selecting numbers using the random number generator to determine the order. In yet another example, the involuntary cue sequence generator 424 uses the random number generator to determine a timing of the one or more cues in the sequence. For example, the involuntary cue sequence generator 424 uses the random number generator to randomly select a number in a range and that number determines the number of second, or milliseconds depending on the implementation, between a first cue and a second cue in the sequence.

In some implementations, the voluntary action liveness detector 328, or a subcomponent 522, 524, 526 thereof, uses the random number generator. For example, the voluntary cue selector 522 uses the random number generator to determine a type of voluntary action to be induced from a plurality of voluntary actions detectable by a set of available sensors. In another example, the voluntary cue selector 522 uses the random number generator to determine a type of cue, such as visual, audible, tactile, or a combination thereof. In yet another example, the voluntary cue selector 522 uses the random number generator to determine a characteristic of the cue. Examples of characteristics include, but are not limited to, a location of the cue, a duration of the cue, a timing of the cue, a size of the cue, an input requested, a manipulation of the device requested, etc. For example, referring again to FIG. 11, in one implementation, the voluntary cue selector 522 uses a random number generator to select an alphanumeric character from the 26 letters of the English alphabet and 10 Arabic numerals from 0 to 9 where each alpha numeric character is assigned a number and the random number generator randomly generates a number, thereby selecting the alphanumeric character the user is cued to draw on the touch screen.

In one example, the voluntary cue sequence generator 524 uses the random number generator to determine a length of a sequence of cues. In another example, the voluntary cue sequence generator 524 uses the random number generator to determine an order of cues in the sequence by assigning each cue a number and selecting numbers using the random number generator to determine the order. In yet another example, the voluntary cue sequence generator 524 uses the random number generator to determine a timing of the one or more cues in the sequence. For example, the involuntary cue sequence generator 424 uses the random number generator to randomly select a number in a range and that number determines the number of second, or milliseconds depending on the implementation, between a first cue and a second cue in the sequence.

It should be understood, by the above description of the possible uses of a random number generator, that the randomization and the number of parameters that may be randomized may provide a massive number of possible combinations of cues and render it unlikely that sensor data from a first liveness detection event may be reused, sometimes referred to as a replay attack, during a subsequent liveness detection event.

Example Methods

Figure 6:
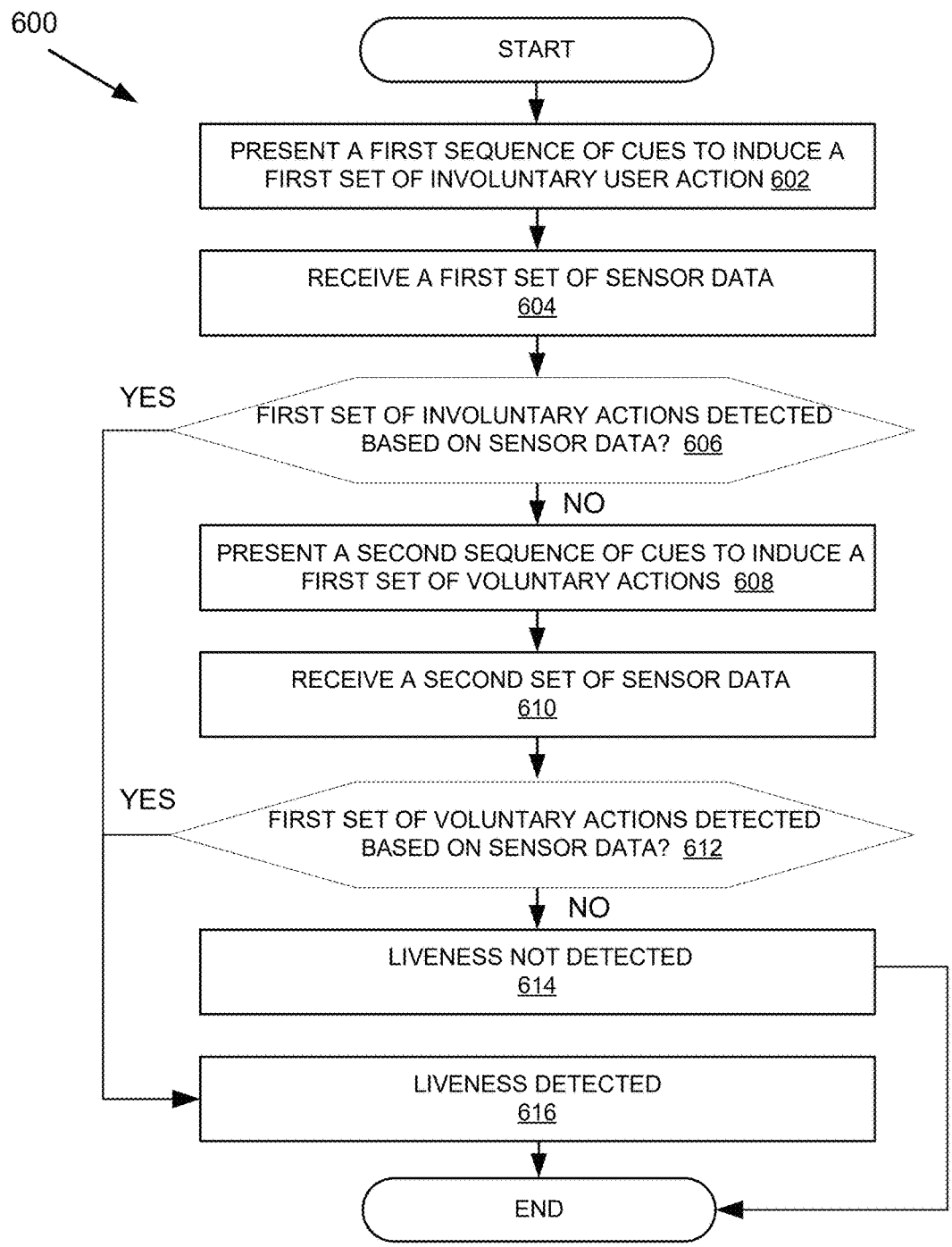
FIG. 6 is a flowchart of an example method for detecting liveness in accordance with some implementations.
Figure 7:
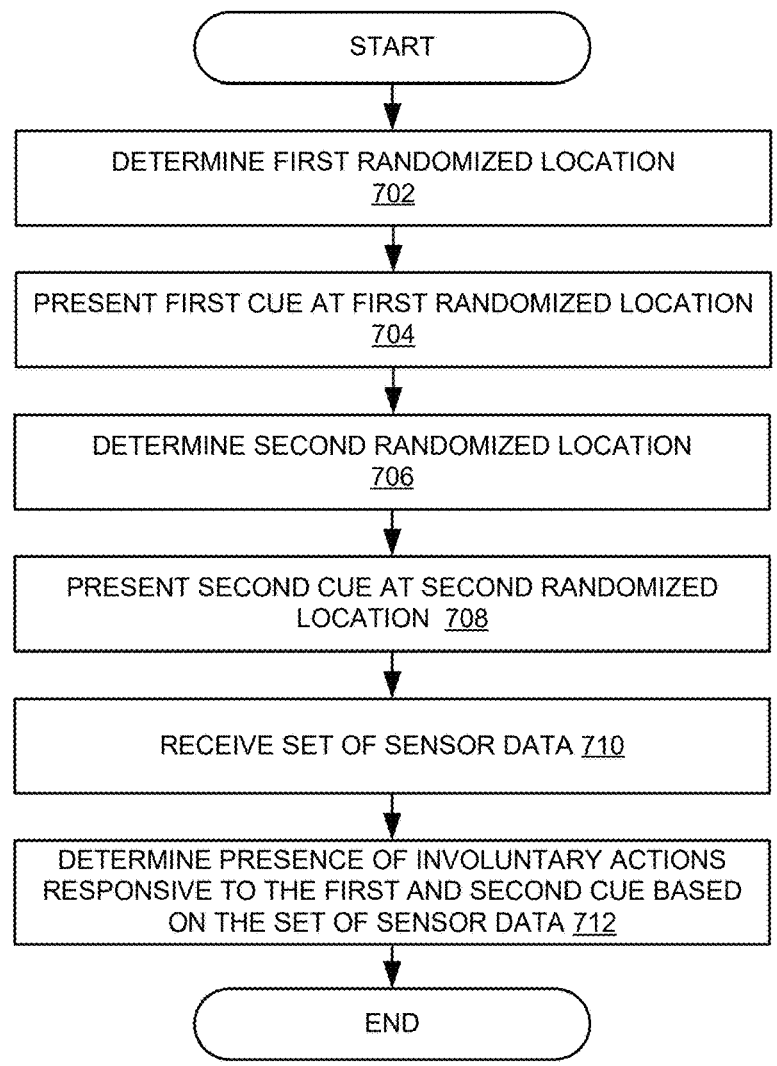
FIG. 7 is a flowchart of an example method for detecting liveness based on involuntary user action in accordance with some implementations.
Figure 8:
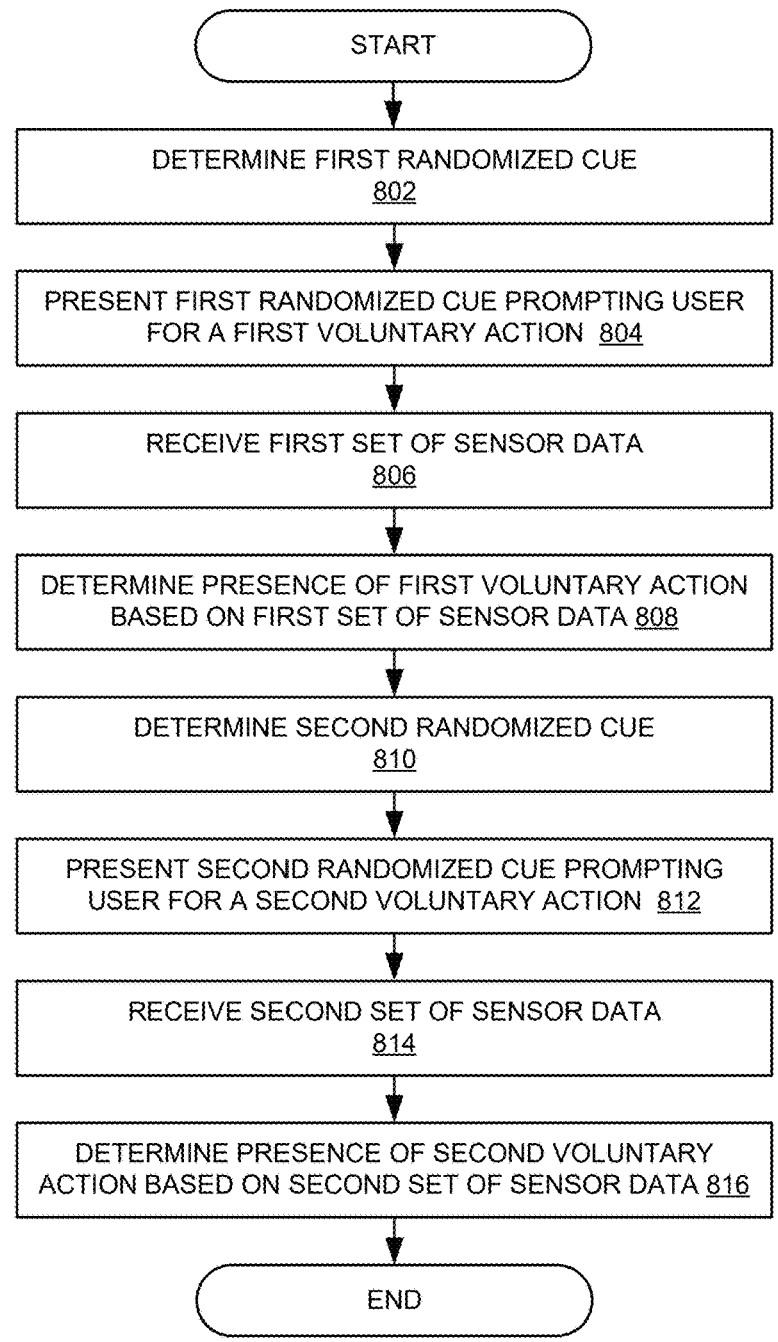
FIG. 8 is a flowchart of an example method for detecting liveness based on voluntary user action in accordance with some implementations.

FIGS. 6-8 are flowcharts of example methods that may, in accordance with some implementations, be performed by the systems described above with reference to FIGS. 1-5 and 9-11. The methods 600-800 of FIGS. 6-8 are provided for illustrative purposes, and it should be understood that many variations exist and are within the scope of the disclosure herein. For example, while method 600 of FIG. 6 presentation of a first and second sequence of cues, one or more sequences of cues may be presented depending on the implementation. As another example, while method 800 of FIG. 8 refers to a first and second randomized cue and voluntary actions, one or more randomized cues may be present in some implementations, and one or more of the actions may be involuntary in some implementations.

FIG. 6 is a flowchart of an example method 600 for detecting liveness in accordance with some implementations. The method 600 begins, at block 602, by presenting a first sequence of cues, generated by the involuntary cue sequence generator 424, to induce a first set of involuntary user action. At block 604, the involuntary action liveness determiner 426 receives a first set of sensor data.

At block 606, the involuntary action liveness determiner 426 determines whether the first set of involuntary actions is detected based on the sensor data received at block 604. When the involuntary action liveness determiner 426 determines that the first set of involuntary actions is detected based on the sensor data (606—YES), the method 600 continues at block 616. At block 616, the involuntary action liveness detector 326 determines that liveness is detected and the method 600 ends. When the involuntary action liveness determiner 426 determines that the first set of involuntary actions are not detected based on the sensor data (606—NO), the method 600 continues at block 608. At block 608, a second sequence of cues, generated by the voluntary cue sequence generator 524, to induce a first set of voluntary user action are presented. At block 610, the voluntary action liveness determiner 526 receives a first set of sensor data.

At block 612, the voluntary action liveness determiner 526 determines whether the first set of voluntary actions is detected based on the sensor data received at block 610. When the voluntary action liveness determiner 526 determines that the first set of voluntary actions is detected based on the sensor data (612—YES), the method 600 continues at block 616. At block 616, the voluntary action liveness detector 328 determines that liveness is detected and the method 600 ends. When the voluntary action liveness determiner 526 determines that the first set of voluntary actions are not detected based on the sensor data (612—NO), the method 600 continues at block 614. At block 614, the voluntary action liveness detector 328 determines liveness is not detected and the method ends.

FIG. 7 is a flowchart of an example method 700 for detecting liveness based on involuntary user action in accordance with some implementations. The method 700 begins, at block 702, by the involuntary cue sequence generator 424 determining a first randomized location. At block 704, the involuntary cue sequence generator 424 presents the first cue at the first randomized location. At block 706, the involuntary cue sequence generator 424 determines a second randomized location. At block 708, the involuntary cue sequence generator 424 presents the second cue at the second randomized location. At block 710, the voluntary action liveness determiner 526 receives a set of sensor data. At block 712, the voluntary action liveness determiner 526 determines the presence of the involuntary actions responsive to the first and second cue based on the set of sensor data received at block 710, and the method 700 ends.

FIG. 8 is a flowchart of an example method 800 for detecting liveness based on voluntary user action in accordance with some implementations. The method 800 begins, at block 802, by the voluntary cue sequence generator 524 determining a first randomized cue. At block 804, the voluntary cue sequence generator 524 presents the first randomized cue prompting the user for a first voluntary action. At block 806, the voluntary action liveness determiner 526 receives a first set of sensor data. At block 808, the voluntary action liveness determiner 526 determines the presence of the first voluntary action based on the first set of sensor data received at block 806. In some implementations, blocks 810-816 are optional. At block 810, the voluntary cue sequence generator 524 determines a second randomized cue. At block 812, the voluntary cue sequence generator 524 presents the second randomized cue prompting the user for a second voluntary action. At block 814, the voluntary action liveness determiner 526 receives a second set of sensor data. At block 816, the voluntary action liveness determiner 526 determines the presence of the second voluntary action based on the second set of sensor data received at block 814, and thereby detects liveness, and the method 800 ends.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
   determining, using one or more processors, a first voluntary action and a first involuntary action to induce in a user;
   generating, using the one or more processors, a first cue for presentation to the user;
   receiving, using the one or more processors, first sensor data representing a first user action responsive to the first cue; and
   determining, using the one or more processors and based on the first sensor data representing the first user action, whether the user is live, wherein one or more of:
      the first user action is the first voluntary action induced by the first cue subsequent to a failure to induce the first involuntary action responsive to a prior cue to induce the first involuntary action in the user, and
      the first user action is the first involuntary action induced subsequent to a failure to induce the first voluntary action responsive to a prior cue to induce the first voluntary action in the user.

2. The computer implemented method of claim 1, wherein determining that the user is live includes determining that the first user action includes multiple involuntary actions.

3. The computer implemented method of claim 1, wherein the first sensor data includes a video from a forward-facing camera associated with a client device capturing a user's eyes, and determining, based on the first sensor data, that the first user action includes an induced, involuntary action includes:
   applying a gaze detection to the video, the video including a period of time capturing the first user action of the user responsive to the first cue; and
   determining, based on the gaze detection, whether the first user action responsive to the first cue includes involuntary user eye movement responsive to the first cue.

4. The computer implemented method of claim 1, wherein the first involuntary action and the first user action responsive to the first cue include a rapid, discrete, and involuntary eye movement.

5. The computer implemented method of claim 1 further comprising:
selecting a first display location from a plurality of predetermined display locations distributed around a peripheral edge of a client device display, and
wherein the first cue includes a first, temporarily displayed visual indicator, the first, temporarily displayed visual indicator displayed at the first display location on the peripheral edge of the client device display.

6. The computer implemented method of claim 5, wherein the first, temporarily displayed visual indicator displayed at the first display location on the peripheral edge of the client device display induces the first user action, the first user action including a rapid, discrete, and involuntary movement of user eyes toward the first display location.

7. The computer implemented method of claim 1 further comprising:
subsequent to determining that the first sensor data representing the first user action fails to satisfy a confidence threshold that the first user action represents the first involuntary action and generating a second cue, receiving second sensor data representing a second user action to the second cue;
determining, based on the second sensor data, whether the second user action satisfies a second threshold; and
determining that the user is live based on the second user action satisfying the second threshold.

8. The computer implemented method of claim 7, wherein the second cue is perceived by a different sensory organ than the first cue.

9. The computer implemented method of claim 7, wherein the second user action includes one or more of providing a user input requested in the second cue and a manipulation of a client device as requested in the second cue.

10. The computer implemented method of claim 7, wherein the second user action includes the user drawing a shape requested in the second cue using a pointer, wherein the pointer is one of a user's finger and a mouse, and the second sensor data represents the shape drawn by the user.

11. A system comprising:
a processor; and
a memory, the memory storing instructions that, when executed by the processor, cause the system to:
determine a first voluntary action and a first involuntary action to induce in a user;
generate a first cue for presentation to the user;
receive first sensor data representing a first user action responsive to the first cue; and
determine, based on the first sensor data representing the first user action, whether the user is live, wherein one of:
the first user action is the first voluntary action induced by the first cue subsequent to a failure to induce the first involuntary action responsive to a prior cue to induce the first involuntary action in the user, and
the first user action is the first involuntary action induced subsequent to a failure to induce first voluntary action responsive to a prior cue to induce the first voluntary action in the user.

12. The system of claim 11, wherein determining that the user is live includes determining that the first user action includes multiple involuntary actions.

13. The system of claim 11, wherein the first sensor data includes a video from a forward-facing camera associated with a client device capturing a user's eyes, and determining, based on the first sensor data, that the first user action includes an induced, involuntary action further includes:
applying a gaze detection to the video, the video including a period of time capturing the first user action of the user responsive to the first cue; and
determining, based on the gaze detection, whether the first user action responsive to the first cue includes involuntary user eye movement responsive to the first cue.

14. The system of claim 11, wherein the first involuntary action and the first user action responsive to the first cue include a rapid, discrete, and involuntary eye movement.

15. The system of claim 11, the memory further stores instructions that, when executed by the processor, cause the system to:
select a first display location from a plurality of predetermined display locations distributed around a peripheral edge of a client device display,
wherein the first cue includes a first, temporarily displayed visual indicator, the first, temporarily displayed visual indicator displayed at the first display location on the peripheral edge of the client device display.

16. The system of claim 15, wherein the first, temporarily displayed visual indicator displayed at the first display location on the peripheral edge of the client device display induces the first user action, the first user action including a rapid, discrete, and involuntary movement of user eyes toward the first display location.

17. The system of claim 11, wherein the memory further stores instructions that, when executed by the processor, cause the system to:
subsequent to determining that the first sensor data representing the first user action does not satisfy a confidence threshold, receive second sensor data representing a second user action to a second cue,
determine, based on the second sensor data, whether the second user action satisfies a second threshold; and
determine that the user is live based on the second user action satisfying the second threshold.

18. The system of claim 17, wherein the second cue is perceived by a different sensory organ than the first cue.

19. The system of claim 17, wherein the second user action includes one or more of providing a user input requested in the second cue and a manipulation of a client device as requested in the second cue.

20. The system of claim 17, wherein the second user action includes the user drawing a shape requested in the second cue using a pointer, wherein the pointer is one of a user's finger and a mouse, and the second sensor data represents the shape drawn by the user.

* * * * *